United States Patent
Ströder et al.

(10) Patent No.: US 11,396,032 B2
(45) Date of Patent: Jul. 26, 2022

(54) SELF-CLEANING ROLLER SCREEN

(71) Applicant: OUTOTEC (FINLAND) OY, Espoo (FI)

(72) Inventors: Michael Ströder, Frankfurt am Main (DE); Roberto Valery, Oberursel (DE); Roger Becker, Pfungstadt (DE); Siegfried Schimo, Friedrichsdorf (DE); Gergö Rimaszeki, Oberursel (DE); Michal Kotrc, Rietschen (DE); Vincent Siauw, Frankfurt am Main (DE); Sebastian Lang, Darmstadt (DE)

(73) Assignee: OUTOTEC (FINLAND) OY, Espoo (FI)

( * ) Notice: Subject to any disclaimer, the term of this patent is extended or adjusted under 35 U.S.C. 154(b) by 784 days.

(21) Appl. No.: 16/324,927

(22) PCT Filed: Aug. 18, 2016

(86) PCT No.: PCT/EP2016/069647
§ 371 (c)(1),
(2) Date: Feb. 12, 2019

(87) PCT Pub. No.: WO2018/033213
PCT Pub. Date: Feb. 22, 2018

(65) Prior Publication Data
US 2021/0276046 A1     Sep. 9, 2021

(51) Int. Cl.
*B07B 1/50* (2006.01)
*B07B 1/14* (2006.01)
*B08B 7/00* (2006.01)

(52) U.S. Cl.
CPC ............. *B07B 1/50* (2013.01); *B07B 1/14* (2013.01); *B08B 7/00* (2013.01)

(58) Field of Classification Search
CPC ................................. B07B 1/50; B07B 1/14
See application file for complete search history.

(56) References Cited

U.S. PATENT DOCUMENTS

| 5,377,848 A | 1/1995 | Jokinen et al. |
| 5,824,356 A | 10/1998 | Silver et al. |
| (Continued) | | |

FOREIGN PATENT DOCUMENTS

| CA | 2213157 A1 * | 2/1999 | ............ B07B 1/50 |
| CN | 2710770 Y | 7/2005 | |
| (Continued) | | | |

OTHER PUBLICATIONS

Notification of First Office Action issued by the China National Intellectual Property Administration in relation to Chinese Application No. 201680088981.7 dated Apr. 26, 2021 (9 pages) along with English language translation (9 pages).

(Continued)

*Primary Examiner* — Patrick H Mackey
(74) *Attorney, Agent, or Firm* — Robert P. Michal, Esq.; Carter, DeLuca & Farrell LLP

(57) ABSTRACT

A method for cleaning of a roller screen transporting and screening particles by means of at least three rotating rollers. The rollers are installed in succession at given clearances and arranged transversally in relation to the transport direction of the particles to screen a desired range of particle sizes. At least one roller changes its circumferential velocity and/or its rotational direction over time at defined time intervals for defined time periods such that for this defined time period for at least one pair of neighbored rollers one roller has a higher circumferential velocity than the other and/or both rollers roll in opposite rotational directions.

6 Claims, 2 Drawing Sheets

(56) References Cited

U.S. PATENT DOCUMENTS

Figure 1:
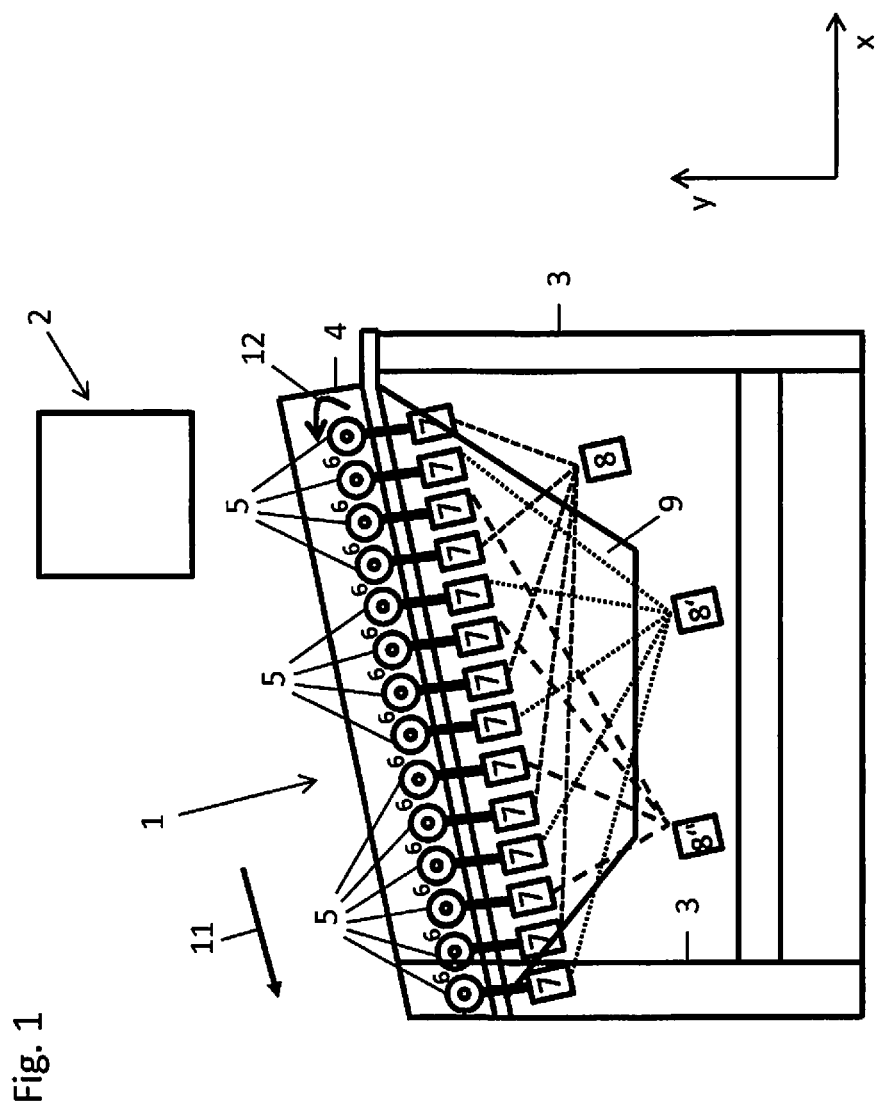

| | | | | |
|---|---|---|---|---|
| 6,196,394 B1 * | 3/2001 | Sieg | ............ | B07B 1/15 |
| | | | | 209/672 |
| 6,253,927 B1 * | 7/2001 | Vaananen | ................ | B07B 1/14 |
| | | | | 209/668 |

FOREIGN PATENT DOCUMENTS

| | | | |
|---|---|---|---|
| CN | 2917831 Y | 7/2007 | |
| CN | 201978884 U | 9/2011 | |
| CN | 205052856 U | 3/2016 | |
| DE | 534888 C | 10/1931 | |
| DE | 19845651 A1 | 4/2000 | |
| DE | 202007011559 U1 | 11/2007 | |
| DE | 102007018092 A1 | 10/2008 | |
| DE | 102007018992 A1 | 10/2008 | |
| DE | 20321860 U1 | 8/2011 | |
| EP | 0946415 B1 | 12/2001 | |
| EP | 2997807 A1 | 3/2016 | |
| FR | 2149389 A1 | 3/1973 | |
| GB | 838405 A | 6/1960 | |
| GB | 2289202 A | 11/1995 | |
| GB | 2289202 A * | 11/1995 | ............ A01D 33/08 |
| WO | WO-03051537 A1 * | 6/2003 | ........... B07B 13/075 |

OTHER PUBLICATIONS

Written Opinion of the International Searching Authority issued by the European Patent Office acting as the International Search Authority in relation to International Application No. PCT/EP2016/069647 dated May 9, 2017 (6 pages).

International Search Report issued by the European Patent Office acting as the International Search Authority in relation to International Application No. PCT/EP2016/069647 dated May 9, 2017 (5 pages).

International Preliminary Report on Patentability issued by the European Patent Office acting as the International Preliminary Examining Authority in relation to International Application No. PCT/EP2016/069647 dated Dec. 3, 2018 (3 pages).

Notification of Third Office Action and Search Report by the China National Intellectual Property Administration in relation to Chinese Application No. 201680088981 dated Apr. 19, 2022, (14 pages) along with English language translation (11 pages).

* cited by examiner

SELF-CLEANING ROLLER SCREEN

CROSS-REFERENCE TO RELATED APPLICATIONS

This application is a National Phase Entry of PCT International Application No. PCT/EP2016/069647, filed Aug. 18, 2016, the disclosure of this application is expressly incorporated herein by reference in its entirety.

The application belongs to a process for cleaning a roller screen transporting and screening particles by means of at least three rotating rollers which are installed in succession at given clearances and arranged transversally in relation to the transport direction of the particles to screen a desired particle size. The invention also belongs to a roller screen for carrying out aforementioned process.

Many material treating processes require separation of poly-dispersed material. Depending on the particle size distribution of the material, for instance the coarsest and/or the finest particles have to be removed from the mixture, so that the material obtained can be processed in a proper way. The desired mixture could consist of particles with a size of a minimal value or between two determined limiting values.

For example, many smelting processes require that the material to be smelted is not too fine grained and therefore a fine material such as an ore concentrate has to be pelletized first and thereafter hardened in a furnace in order to improve the strength of the pellets. However, the capacity of the hardening furnace is dependent, amongst others, on the size of the pellets fed therein. Therefore, in general a separating device is arranged in between the pelletizing apparatus and the hardening furnace to separate the desired pellet size fraction from too big or too small pellets. In this context, hardening of ferrous-containing pellets is a well-known process.

A typical separation device to segregate too big and/or too small solid particles is a roller screen. Such a roller screen comprises a plurality of successive rollers preferably rotating in preferably parallel axis of rotation. The rollers' upper sides provide a pass for the material to be screened. At least one drive means for rotating each roller is foreseen. Further, a roller screen features a means for feeding the material onto the screen and one for dropping off as well as a means to collect the small particles falling down through the clearances between the rolls. In addition, a collecting device for the particles big enough to proceed with is foreseen at the end of the roller screen. For example, such a roller screen is described in U.S. Pat. No. 5,377,848.

A roller screen able to separate particles with a size between two determined limiting values is described in EP 0 946 415 B1.

Document DE 10 2007 018 992 A1 describes a roller screen which can be cooled via devices in the rollers.

Further possibilities of a roller screen design are found in DE 20 2007 011 559 U1.

All roller screens have in common that they pollute over the time. Pellets, which fall between two rolls and are neither transported to the next roller nor falling down through the gaps get deformed to cylinders. Two or more of those deformed pellets can stick together and create so called "sausages". Thereby the clearances get blocked by particles stuck in the gaps between the rollers. This effect leads to a loss of selectivity of the roller screen due to the fact that undesired small particles can be transported over the bridged gaps and do no longer fall through the roller screen. As a result, the screening efficiency is decreased.

Typically, the gaps between the rollers have to be cleaned manually. Therefore, manpower is required. Especially in the field of application for roller screens with inconvenient environmental conditions, like iron ore pelletizing, it would be a huge advantage to find another possibility to clean the rollers and provide a roller screen with a constantly high screening efficiency.

Document DE 534 888 describes a possibility whereby the rollers are formed with gussets, so that each gusset of one roller interlocks with a relating cavity in the neighboring roller and, thereby cleans clumped material out. However, in such an arrangement also small particles are transported via the roller so screening efficiency is reduced, too. The same holds true for the nearly similar solution of document DE 20321860 U1.

Therefore, it is the object of the current invention to provide a method and the correlating apparatus for cleaning a roller screen without any manpower and for maintaining a high screening efficiency.

This problem is solved by a process with the features of current claim 1.

Thereby, particles get moved via at least three rotating rollers, typically all rotating in the same direction and with the same circumferential velocity, which are installed in succession at given clearances and arranged transversally in relation to the moving direction of the particles, which are screened according a desired particle size distribution.

Preferably beginning from the first or the second roller at least one roller, preferably every second roller changes its circumferential velocity and/or its rotational direction over time at defined time intervals for a defined time period such that in at least one pair of neighbored rollers one roller rotates faster than the other and/or both rollers rotate in opposite directions. Thereby, the faster roller of the roller pair will give an additional impulse to the particles in the gap between the roller pair. If the first roller of the roller pair is the faster one, the additional impulse will either flicks the particles downwards out of the gap or the particle is somehow deformed by the two rollers and passes through the gap downwards. If the second roller of the roller pair is the faster one, the additional impulse will have the tendency to flick the particles in the gap between the pair of rollers upwards out of the gap and transport them to the gap between this second roller of the roller pair and the subsequent roller. However, in every case the gap between two neighbored rollers is cleaned if one of the neighbored rollers rotates faster than the other or both rollers roll in opposite rolling directions. Due to the automated changing of the circumferential velocity or the rotation direction, manpower or manual cleaning is no longer needed.

Preferably, each roller changes its circumferential velocity and/or its rotational direction. Thereby, the cleaning effect is maximized. But it is also possible to only change the circumferential velocity and/or rotation direction of every second roller over time and keep the other rollers rotating at a constant circumferential velocity and rotation direction.

In another preferred embodiment of the invention, the defined time intervals are periodic. Thereby, the scheme of the changes in circumferential velocity and/or the rotational direction can be programmed easily. However, it is also possible that the defined time intervals are at random or varied according to the degree of blocking of the screen (e.g. optically sensed).

Further, it is preferred that at least one roller is driven separately. Thereby, a changing of the circumferential velocity and/or the rotational direction can easily be performed.

In another preferred embodiment, at least one roller beginning preferably from the first or the second roller are braked or not propelled at defined time intervals. Thereby, a variation over time in the circumferential velocity can be performed easily and the other, not braked roller in a pair of rollers will rotate faster during the braking and, thereby, the wanted cleaning effect will occur, too. Installing a braking of at least one, preferably each second roller is much easier in already existing plants and, therefore, offers the possibility of a cheap and easy upgrade. Braking in the sense of the invention means preferably that the at least one specific roller is actively braked or slowed down by switching off the drive motor or by switching the drive motor to a higher pole pair number.

The invention works best if the variation in the circumferential velocity and/or the rotational direction is performed successively. For example, one preferred way is to accelerate the third roller immediately after the second roller has returned to normal velocity. Another possibility is to install a delay between subsequent accelerations. However, it is necessary that the acceleration pattern is such that two neighboring rollers are never accelerated at the same time.

Further, controlling of the rollers in groups is possible. In detail, this means that the whole number of rollers is dividable by a factor. This factor gives the number of groups in which the rollers are grouped. Each roller with the same position in each group is connected to the same converter in case of an electric propulsion system. This means e.g. a roller screen with 30 rollers shows six groups of five rollers each. Each first roller of each group is connected to the same frequency converter and analogously for number 2 to 5 in each group. Thereby, the number of used frequency converters can be reduced.

In another embodiment of the invention, at least one roller changes its circumferential velocity and/or its rotational direction at the same time. Thereby, the process to change circumferential velocity and/or rotational direction can be performed in one step, the changing can, therefore, be achieved with only one device affecting said roller. So, invest costs can be reduced.

In a preferred version of this embodiment, each second roller will be driven at a steering scheme, according to which every second roller is periodically accelerated to a higher circumferential velocity than the neighbored roller for a certain time period and then braked to a lower circumferential velocity than the neighbored roller. This can be done in combination with time intervals in between the higher and lower circumferential velocities or without. In those optional time intervals between deviating circumferential velocities all rollers are preferably driven at the same circumferential velocity.

First simulations have shown that the length of the time intervals between cleaning events of individual gaps is best between 3 and 3000 sec, preferably between 5 and 60 sec. So the constant clean state of the roller screen can be achieved without affecting too much the transporting function of the roller screen and, thereby, the material flow.

Further, it was observed that the ratio between the change of circumferential velocity and unchanged circumferential velocity is best between 15 and 200%, preferably between 80 and 120%, most preferred between 90 and 110% of the circumferential velocity of the neighboring rollers. Thereby, the best cleaning effect is achieved without losing too much energy due to braking processes or accelerating the rollers.

Moreover, it was seen that changing of the circumferential velocity leads to the best results if it lasts for a time period of 0.1 to 30 sec, preferably between 1 and 5 sec. This period is long enough to transport those particles forward or downwards, which had been canted between two rollers. On the other hand this period is short enough to avoid quick wear of the roller surfaces, which is typically induced when two neighboring rollers are running at different circumferential velocities.

The slope of acceleration and deceleration can be adjusted in the automatic steering.

Further, the invention also covers an apparatus according to the features of claim 11.

Such a roller screen to segregate a desired particle size comprises at least three rotating rollers which are installed in succession at given clearances and arranged transversally in relation to the moving direction of the particles. Preferably beginning from the first or the second roller at least one, preferably every second roller features a device to change the circumferential velocity at defined time intervals for a defined time period such that in at least one pair of neighbored rollers one roller rotates faster than the other and/or both rollers roll in opposite rolling directions. Thereby, the gap between the two rollers is cleaned since particles being stuck in the clearance are flipped out, either upward-forward or downward.

Preferably, such a roller screen shows, preferably beginning from the first or the second roller, a brake for at least one, preferably every second roller. Such a brake is a very simple device to change the rotating speed of the roller and can also be installed in an already existing roller screen. Also, controlling of a brake is very easy and well-known to the skilled person.

In another possibility, every roller features an electric or hydraulic motor for specifically driving that roller(s). Thereby, individual rollers are accelerated to higher circumferential velocities for certain time periods. These motors can be steered by a distributed control system or by a local programmable logic control.

In this context, it is preferred that, preferably beginning from the first or the second roller, at least one, preferably every second roller is connected to a frequency converter so that several motors are driven with the same frequency. So, these rollers can be controlled together and the invest costs are reduced. However it is also possible to have several rollers 5 connected to one chain drive with one drive motor, and other rollers 5, e.g. every second roller, connected to another chain drive with another drive motor, connected to a frequency converter. In this way it is also possible to induce different circumferential velocities between neighbored rollers for certain time intervals and thereby clean the rollers.

Developments and advantages in application possibilities of the invention also emerge from the following description of the process. All features described and/or illustrated in the drawings form the subject matter of the invention are per se or in any combination independent of their inclusion in the claims or their back references.

IN THE FIGURES

Figure 2:
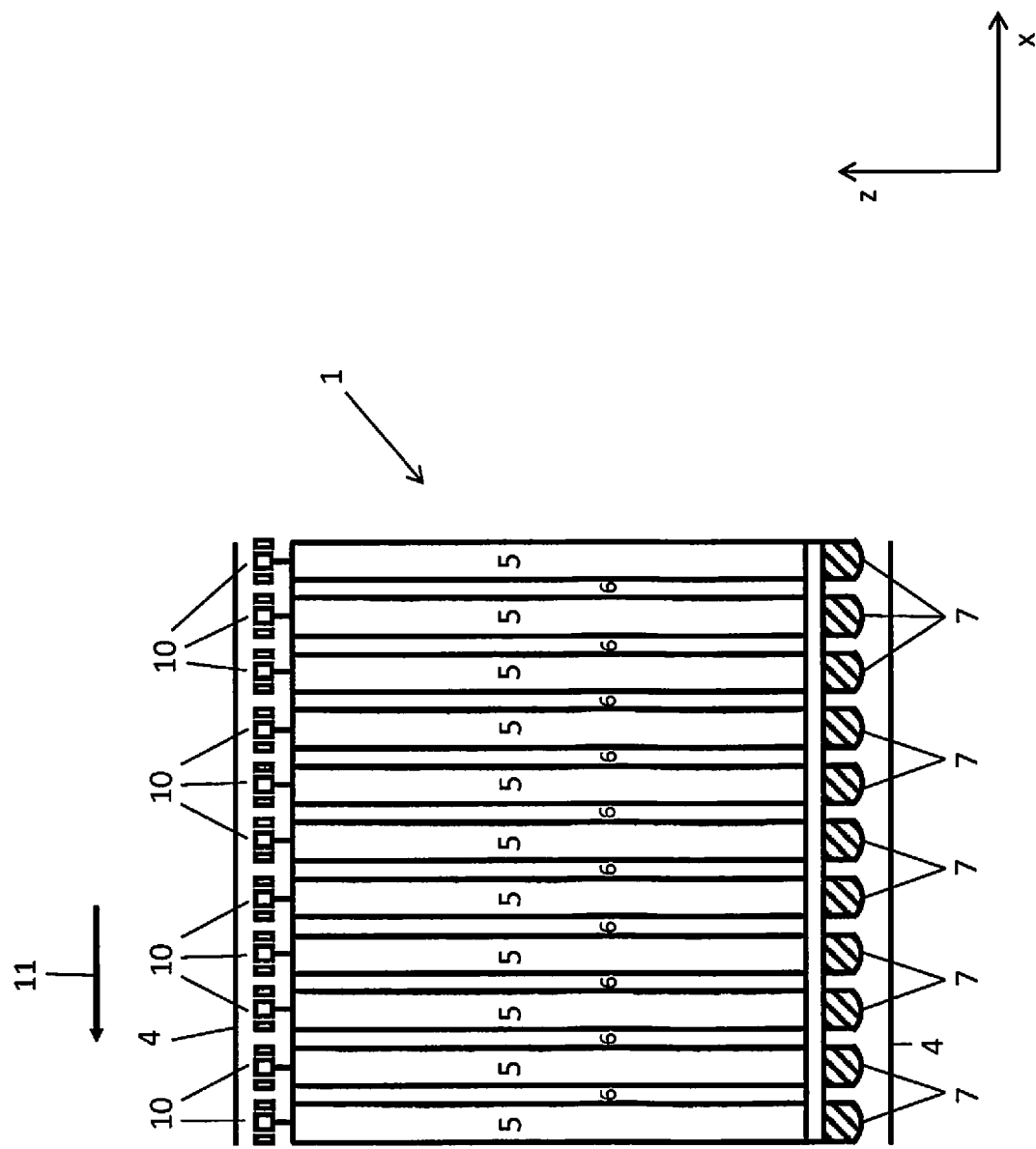

FIG. 1 shows an X-Y view for a first embodiment of a roller screen according to the invention, FIG. 2 shows an X-Z view for a first embodiment of a roller screen according to the invention.

FIG. 1 shows a preferred embodiment of the invention in a partial side view cross-section of the roller screen 1 belonging to a roller screen for pellets. The roller screen 1 is installed with respect to an apparatus for the agglomeration of pellets 2 so that the pellets discharged from there fall on the roller screen 1. Any other feeding device for another form of pellets or particles is possible.

Preferably, the roller screen 1 is essentially arranged in an inclined position to improve the particle transport in the transport direction 11. The transport direction 11 is also determined by the typical direction of the roller rotation 12 which is typically identical for all rollers. The roller screen 1 is supported via a supporting structure 3 on which the frame 4 of the roller screen 1 is installed.

The frame 4 is further provided with rollers 5, so that the rollers 5 are located underneath the frame 4. Between the rollers 5, given clearances 6 with a defined dimension are foreseen. Next to the agglomeration apparatus 2 the pellets will move downwards onto the rollers 5. The pellets are screened by means of the roller screen in order to separate such pellets that are too small in diameter and unsuitable for the hardening process. Pellets that are too small drop through the clearances 6 between the rollers 5 into the funnel 9 from where they are returned in a not shown way to the agglomeration apparatus 2. The funnel 9 can be replaced by a belt conveyor, which is also not shown in the figure.

According to the invention at least every second roller has a separate means 7 to vary the circumferential velocity so a difference of circumferential velocity of neighboring rollers 5 can be induced. Thereby, relative circumferential velocity as well as different rotational direction can be changed individually. Thereby, particles respectively pellets which have been lodged in the clearance 6 between two rollers 5 can be flipped out of the clearance, either upward or downward, and, therefore, by periodically changing the circumferential velocities in defined time intervals for defined periods enables a cleaning of the roller screen without any manpower. The means 7 to vary the circumferential velocity can be electric motors connected to a frequency converter or hydraulic motors or mechanical or electrical brakes or an electrical switch to shut off an electric motor for short time periods or to switch it to a different pole pair number, i.e. different circumferential velocity, or a switch to change the rotational direction.

It is preferred that respective means 7 are electrical motors coupled to frequency converters 8, preferably, several electrical motors are connected to the same frequency converter. FIG. 1 shows an example according to which 14 rollers 5 have 14 individual drive motors, arranged in 3 groups of 4 to 5 rollers, where the $1^{st}$ and $4^{th}$ and $7^{th}$ and $10^{th}$ and $13^{th}$ roller are connected to a first frequency converter 8, the $2^{nd}$ and $5^{th}$ and $11^{th}$ and $14^{th}$ roller are connected to a second frequency converter 8' and the $3^{rd}$ and $6^{th}$ and $9^{th}$ and $12^{th}$ roller are connected to a third frequency converter 8".

The same effect can also be generated in an embodiment as shown in FIG. 2. Thereby, at least each second roller 5 in the roller screen 1 shows a mechanical brake 10. By braking certain rollers 5, e.g. every second roller, the circumferential velocity of said rollers 5 can be reduced. Thereby, the complex use of a high number of separate motors and additional frequency converters can be avoided. Further, an upgrade of an existing roller screen 1 by adding additional brakes is quite easy and comparably cheap.

Naturally, the concept of FIGS. 1 and 2, which is explained in connection with plants for pelletizing iron ore can be operated with any other form of particles like in the food or mining industry, etc.

The variation of the circumferential velocity or of the rotational direction of an individual roller 5 always helps cleaning the two gaps 6 on both sides of this roller 5 since the changed circumferential velocity in the roller 5 frees both clearances 6 from pellets getting stuck in these clearances 6 by flipping them upwards or downwards.

REFERENCE NUMBERS 1 roller screen
2 agglomeration apparatus
3 supporting structure
4 frame
5 roller
6 clearance
7 means to vary the circumferential velocity
8 frequency converter
9 funnel
10 brake
11 transport direction
12 typical direction of roller rotation

The invention claimed is:

1. A method for cleaning of a roller screen transporting and screening particles by means of a plurality of rotating rollers, the method comprising:
   installing in succession the plurality of rotating rollers at given clearances and arranged transversally in relation to a transport direction of the particles to screen a desired range of particle sizes, wherein the plurality of rotating rollers are divided into at least two groups, a first group of the at least two groups including at least two rotating rollers of the plurality of rotating rollers, and a second group of the at least two groups including at least one rotating roller of the plurality of rotating rollers;
   providing a separate frequency converter for each group of the at least two groups to which all rotating rollers of the respective group of the at least two groups are connected, at least one group of the at least two groups of rotating rollers changes:
      its circumferential velocity such that for defined time periods for at least one pair of neighbored rollers of the plurality of rotating rollers a first roller of the at least one pair of neighbored rollers has a higher circumferential velocity than a second rotating roller of the at least one pair of neighbored rollers; and/or
      its rotational direction for the defined time periods such that for the defined time periods the at least one pair of neighbored rollers roll in opposite rotational directions,
   wherein all of the plurality of rollers are driven with the same circumferential velocity and the same rotating direction between the defined time periods.

2. The method according to claim 1, wherein every other roller of the plurality of rollers changes its circumferential velocity and/or its rotational direction.

3. The method according to claim 1, wherein the defined time periods are periodic or random.

4. The method according to claim 1, wherein the length of each of the defined time periods is from 0.1 to 3000 sec.

5. The method according to claim 1, wherein the ratio between the changed circumferential velocity and the unchanged circumferential velocity is between 50 to 200%.

6. The method according to claim 1, wherein the length of each of the defined time periods is from 0.1 to 30 sec.

* * * * *